(12) United States Patent
Hasegawa et al.

(10) Patent No.: US 9,485,385 B2
(45) Date of Patent: Nov. 1, 2016

(54) IMAGE PROCESSING APPARATUS AND COMPUTER PROGRAM FOR GENERATING A FILE IN WHICH PLURAL AREA IMAGES OF A DOCUMENT IMAGE ARE DISPOSED IN DIFFERENT PAGES

(71) Applicant: BROTHER KOGYO KABUSHIKI KAISHA, Nagoya-shi, Aichi-ken (JP)

(72) Inventors: Tomohiko Hasegawa, Okazaki (JP); Masaki Kondo, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/719,533

(22) Filed: May 22, 2015

(65) Prior Publication Data
US 2015/0319331 A1 Nov. 5, 2015

Related U.S. Application Data

(63) Continuation of application No. 13/932,790, filed on Jul. 1, 2013, now Pat. No. 9,071,736.

(30) Foreign Application Priority Data

Jul. 1, 2012 (JP) ................................ 2012-148085

(51) Int. Cl.
*H04N 1/21* (2006.01)
*H04N 1/04* (2006.01)
*H04N 1/23* (2006.01)

(52) U.S. Cl.
CPC ............. *H04N 1/2166* (2013.01); *H04N 1/04* (2013.01); *H04N 1/233* (2013.01);
(Continued)

(58) Field of Classification Search
CPC ........ H04N 1/04; H04N 1/21; H04N 1/2166; H04N 1/233; H04N 1/38; H04N 2201/212; H04N 2201/3243; H04N 2201/325; H04N 2201/3254; H04N 2201/3266; H04N 2201/3271
See application file for complete search history.

(56) References Cited

U.S. PATENT DOCUMENTS

| 6,427,058 B1 | 7/2002 | Akiba et al. |
| 7,525,675 B2 | 4/2009 | Shelton et al. |

(Continued)

FOREIGN PATENT DOCUMENTS

| EP | 2224722 A2 | 9/2010 |
| JP | 6-296225 A | 10/1994 |

(Continued)

OTHER PUBLICATIONS

Office Action issued in related U.S. Appl. No. 13/932,933, Jul. 30, 2015.

(Continued)

*Primary Examiner* — Thomas D Lee
(74) *Attorney, Agent, or Firm* — Merchant & Gould P.C.

(57) ABSTRACT

An image processing apparatus includes a processor, and memory storing computer readable instructions, when executed by the processor, causing the apparatus to function as a document image acquiring unit configured to acquire document image data which is generated by optically reading a document and represents a document image, an area image generating unit configured to use the document image data to generate plural area image data representing plural area images that are included in the document image, and a file generating unit configured to generate a file including the plural area image data such that the plural area images are disposed in different pages.

8 Claims, 17 Drawing Sheets

(52) U.S. Cl.
CPC . *H04N 2201/212* (2013.01); *H04N 2201/325* (2013.01); *H04N 2201/3243* (2013.01); *H04N 2201/3254* (2013.01); *H04N 2201/3266* (2013.01); *H04N 2201/3271* (2013.01)

(56) References Cited

U.S. PATENT DOCUMENTS

| | | | |
|---|---|---|---|
| 8,203,763 B2* | 6/2012 | Megawa | H04N 1/3877 358/400 |
| 2005/0062991 A1 | 3/2005 | Fujishige et al. | |
| 2006/0117182 A1 | 6/2006 | Wolff | |
| 2007/0022370 A1 | 1/2007 | Lagardere et al. | |
| 2007/0195378 A1* | 8/2007 | Yoshida | H04N 1/00795 358/470 |
| 2009/0248639 A1 | 10/2009 | Sasaki et al. | |
| 2009/0248676 A1 | 10/2009 | Sasaki | |
| 2010/0002247 A1 | 1/2010 | Tsuchiya | |
| 2010/0201995 A1 | 8/2010 | Yoshida | |
| 2010/0220343 A1 | 9/2010 | Horikawa | |
| 2011/0157215 A1 | 6/2011 | Aoyagi | |
| 2011/0170128 A1 | 7/2011 | Takahashi | |
| 2012/0011429 A1 | 1/2012 | Kosaka et al. | |
| 2012/0170076 A1* | 7/2012 | Ogasawara | H04N 1/00846 358/1.15 |
| 2012/0194846 A1 | 8/2012 | Adachi et al. | |
| 2014/0002863 A1 | 1/2014 | Hasegawa et al. | |
| 2014/0078545 A1 | 3/2014 | Hasegawa et al. | |

FOREIGN PATENT DOCUMENTS

| | | |
|---|---|---|
| JP | 2004-282668 A | 10/2004 |
| JP | 2005-17923 A | 1/2005 |
| JP | 2007-13799 A | 1/2007 |
| JP | 2007-235885 A | 9/2007 |
| JP | 2009-237890 A | 10/2009 |
| JP | 2009-239617 A | 10/2009 |
| JP | 2009-282733 A | 12/2009 |
| JP | 2010-187056 A | 8/2010 |

OTHER PUBLICATIONS

Office Action issued in related U.S. Appl. No. 13/932,933, Mar. 26, 2015.
Office Action issued in related U.S. Appl. No. 13/932,881, mailed Jul. 16, 2015.
U.S. Office Action issued in related U.S. Appl. No. 13/932,881, mailed Jan. 20, 2016.
Office Action issued in related U.S. Appl. No. 13/932,933, mailed Apr. 21, 2016.
Japanese Office Action issued in related Japanese application No. 2012-148085, mailed Feb. 9, 2016.
Japanese Office Action issued in related Japanese application No. 2012-148087, mailed Feb. 9, 2016.
Japanese Office Action issued in related Japanese application No. 2012-148086, mailed Mar. 8, 2016.
Extended European Search Report issued in European Application No. 13174374.2, mailed Dec. 17, 2015.

* cited by examiner

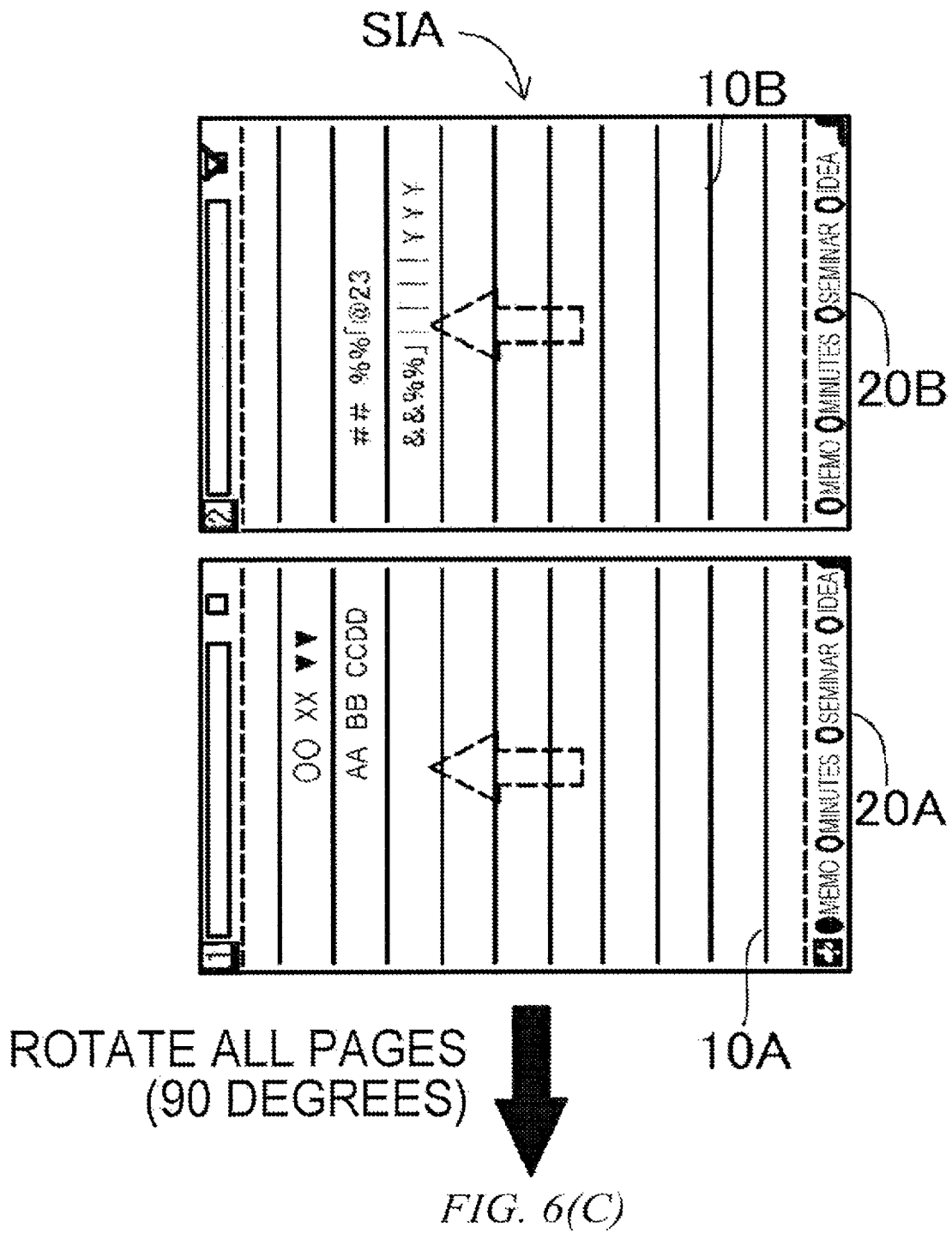

DIVISION → *FIG. 7(B)*

FIG. 7(B)
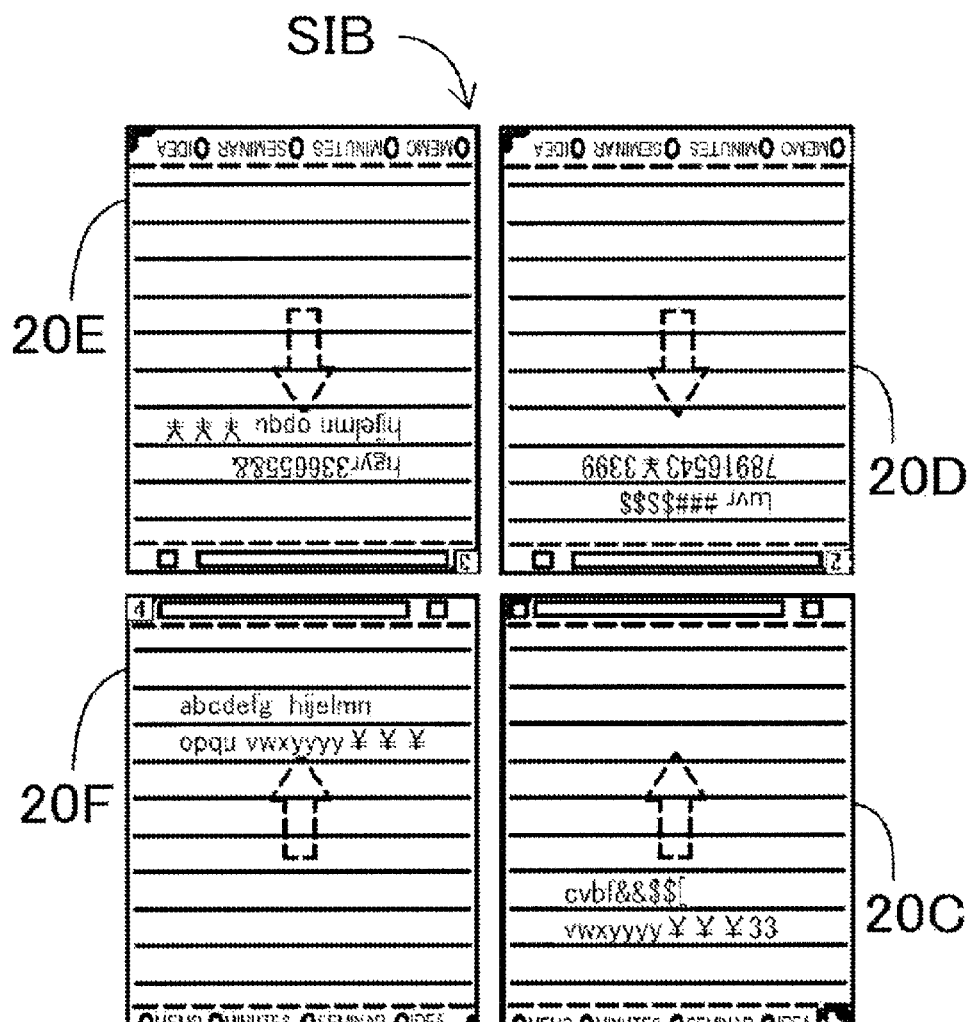
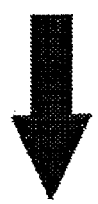 ROTATE A PART
(180 DEGREES)
FIG. 7(C)

FIG. 8

| DOCUMENT IMAGE NUMBER SN | DOCUMENT IMAGE PAGE NUMBER SPN | SKIP INFORMATION SK | PDF FILE NUMBER PN | PDF PAGE NUMBER PPN | ASSOCIATED KEYWORD KW |
|---|---|---|---|---|---|
| 1 | 1 | — | 1 | 1 | MINUTES |
| 1 | 2 | — | 1 | 2 | MINUTES |
| 1 | 3 | — | 1 | 3 | MINUTES |
| 1 | 4 | — | 1 | 4 | MINUTES |
| 2 | 1 | — | 1 | 5 | MINUTES |
| 2 | 2 | — | 2 | 1 | MEMO |
| 2 | 3 | — | 2 | 2 | MEMO |
| 2 | 4 | — | 3 | 1 | IDEA |
| 3 | 1 | — | 3 | 2 | IDEA |
| 3 | 2 | — | 3 | 3 | IDEA |
| 3 | 3 | — | 3 | 4 | IDEA |
| 3 | 4 | SKIP | — | — | — |

MT

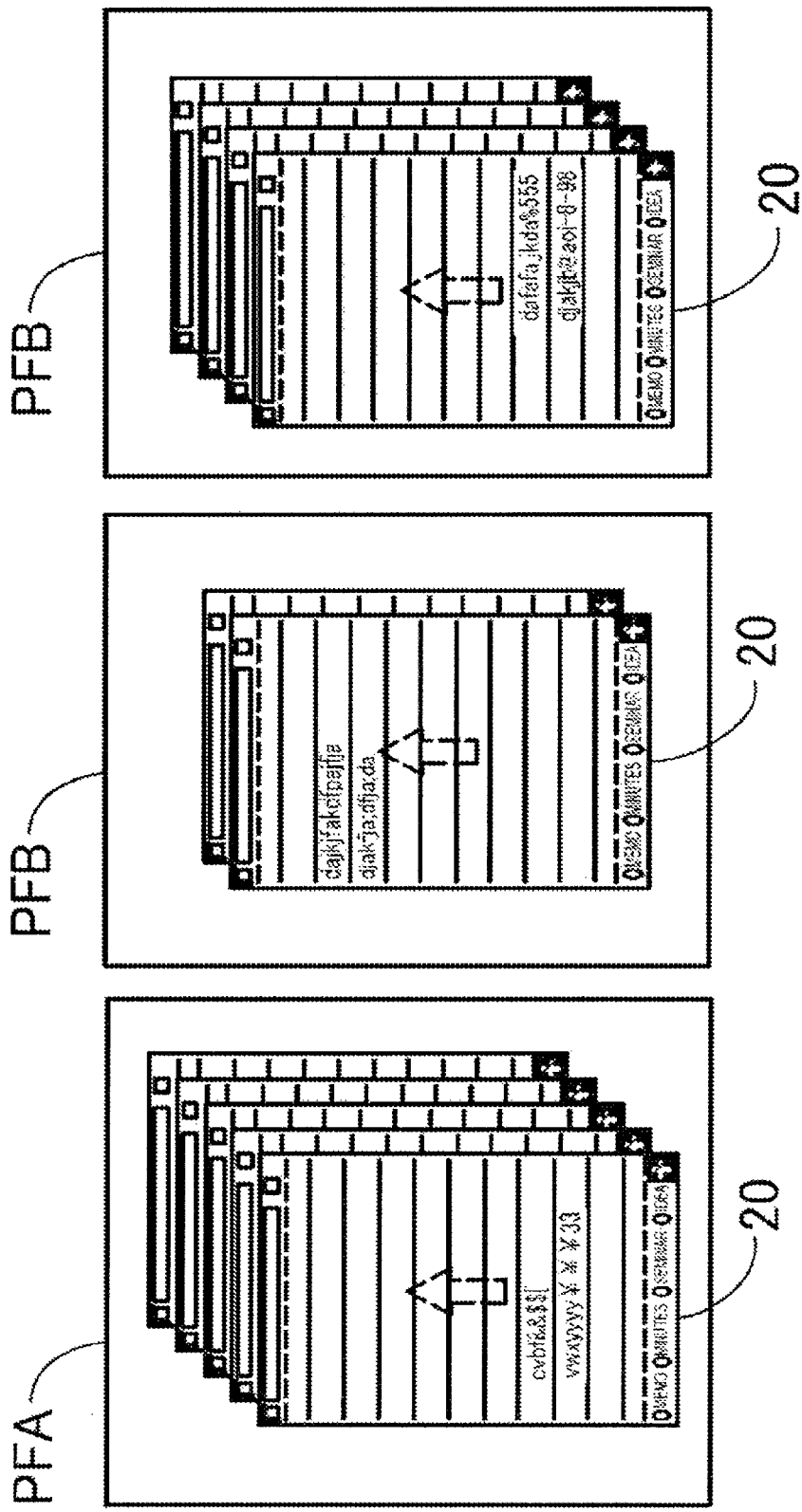

IMAGE PROCESSING APPARATUS AND COMPUTER PROGRAM FOR GENERATING A FILE IN WHICH PLURAL AREA IMAGES OF A DOCUMENT IMAGE ARE DISPOSED IN DIFFERENT PAGES

CROSS-REFERENCE TO RELATED APPLICATION

This application is a continuation of U.S. patent application Ser. No. 13/932,790, filed Jul. 1, 2013, and further claims priority from Japanese Patent Application No. 2012-148085, filed on Jul. 1, 2012, the entire subject matter of both of which are incorporated herein by reference.

TECHNICAL FIELD

Aspects of the present invention relate to a technique of using document image data representing document images to generate a file including plural pages.

BACKGROUND

It is common to read sheets (documents) by a scanner and store document image data representing document images. In order to store document images in a form convenient for a user, various image processing techniques of processing document image data have been proposed. For example, JP-A-2010-187056 describes a technique of using one document image data obtained by reading one page of a document having plural images printed thereon to generate plural image data representing the plural images, respectively.

SUMMARY

It is demanded to improve user convenience in storing a document image including plural images.

An aspect of the present invention provides a technique of storing a document image including plural images in a convenient form.

The present invention has been made in view of the above circumstances and provides the following illustrative embodiment.

According to an illustrative embodiment, there is provided an image processing apparatus comprising: a processor; and memory storing computer readable instructions, when executed by the processor, causing the apparatus to function as: a document image acquiring unit configured to acquire document image data which is generated by optically reading a document and represents a document image; an area image generating unit configured to use the document image data to generate plural area image data representing plural area images that are included in the document image; and a file generating unit configured to generate a file including the plural area image data such that the plural area images are disposed in different pages.

According to the above-mentioned configuration, it is possible to use the document image data to generate a file in which the plural area images included in the document image are disposed on different pages. Therefore, it is possible to store the document image including the plural area images in a convenient form.

The present invention can be implemented in various forms such as a method of implementing the function of the above-mentioned apparatus, a computer program for implementing the function of the above-mentioned apparatus, and a recording medium having the computer program recorded thereon.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 6A to 6C are explanatory views illustrating the division document generating process;

FIGS. 7A to 7C are explanatory views illustrating the division document generating process;

FIG. 8 is a view illustrating an example of a management table MT;

DETAILED DESCRIPTION

A. Illustrative Embodiment

A-1. Configuration of Document Storing System 1000

Figure 1:
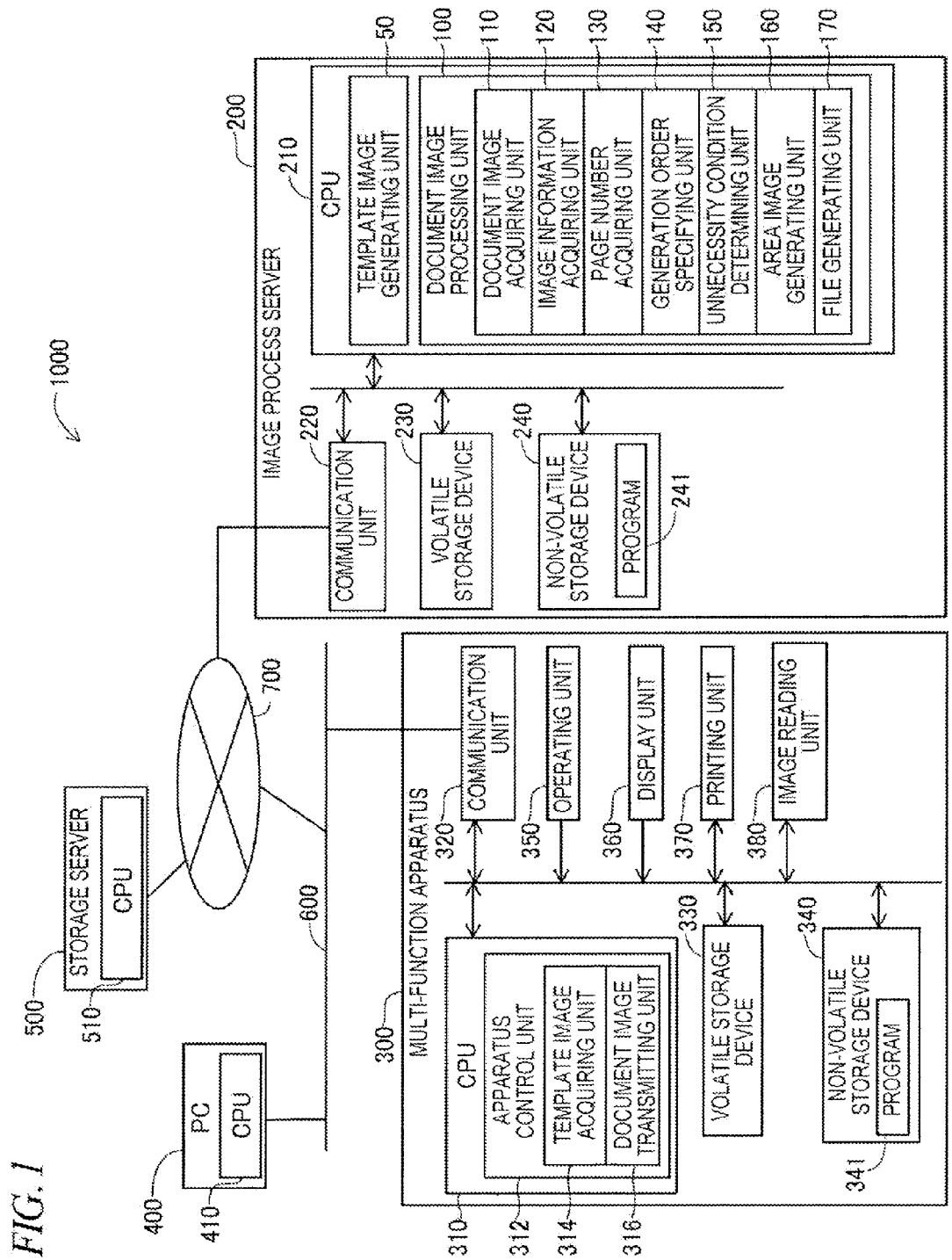
FIG. 1 is a block diagram illustrating a configuration of a document storing system 1000.

FIG. 1 is a block diagram illustrating a configuration of a document storing system 1000. The document storing system 1000 includes an image process server 200, a multi-function apparatus 300, a personal computer 400, and a storage server 500. The multi-function apparatus 300 and the personal computer 400 are used by the same user, and are connected to each other through a LAN 600 to be communicable with each other. The multi-function apparatus 300 and the personal computer 400 are connected to the Internet 700 through the LAN 600. Each of the image process server 200 and the storage server 500 is connected to the Internet 700.

The multi-function apparatus 300 includes a CPU 310 for controlling the entire multi-function apparatus 300, a volatile storage device 330 such as a RAM, a non-volatile storage device 340 such as a flash memory, a communication unit 320 for connection with an external device (such as a device to which the multi-function apparatus 300 can be connected through a network, or an external storage device such as a USB memory), an operating unit 350 including various buttons, a display unit 360 such as a liquid crystal panel, a printing unit 370 which is an ink jet or laser printer engine, and an image reading unit 380.

The image reading unit 380 is a scanner which uses a one-dimensional image sensor having plural photoelectric conversion elements such as CCDs or CMOSs lined up in row to optically read a document to generate document image data (scan data). The image reading unit 380 may include, for example, an automatic document feeder to sequentially read plural pages of a document, thereby automatically generating plural document image data.

The non-volatile storage device 340 stores a computer program 341. The computer program 341 can be recorded on a CD-ROM or the like to be provided. The CPU 310 executes the program 341 to function as an apparatus control unit 312 for controlling the entire multi-function apparatus 300. The apparatus control unit 312 includes a template image acquiring unit 314, and a document image transmitting unit 316. These functional units perform processes to be described below.

The image process server 200 includes a CPU 210, a volatile storage device 230 such as a RAM, a non-volatile storage device 240 such as a hard disk, and a communication unit 220 including an interface for connection with the Internet 700. The non-volatile storage device 240 stores a computer program 241. The computer program 241 can be recorded on a CD-ROM or the like to be provided.

The CPU 210 executes the computer program 241 to function as a template image generating unit 50 and a document image processing unit 100. The document image processing unit 100 includes a document image acquiring unit 110, an image information acquiring unit 120, a page number acquiring unit 130, a generation order specifying unit 140, an unnecessity condition determining unit 150, an area image generating unit 160, and a file generating unit 170. These functional units perform processes to be described below.

The storage server 500 is a general computer, and includes a CPU 510 which executes a server program (not shown) to provide a service to store or save user's data. Specifically, a user can store document image data representing a document in the storage server 500 through the multi-function apparatus 300 and the image process server 200 as will be described below.

The personal computer 400 includes a CPU 410 which executes a program to function as a driver (not shown) for controlling the multi-function apparatus 300, or a client to access the image process server 200. The user can use the personal computer 400 to access to document image data stored in the storage server 500.

A-2. Operation of Document Storing System 1000

The operation of the document storing system 1000 will be described with a focus on a process which the image process server 200 performs.

A-2-1: Template Image Data Generating Process

Figure 2:
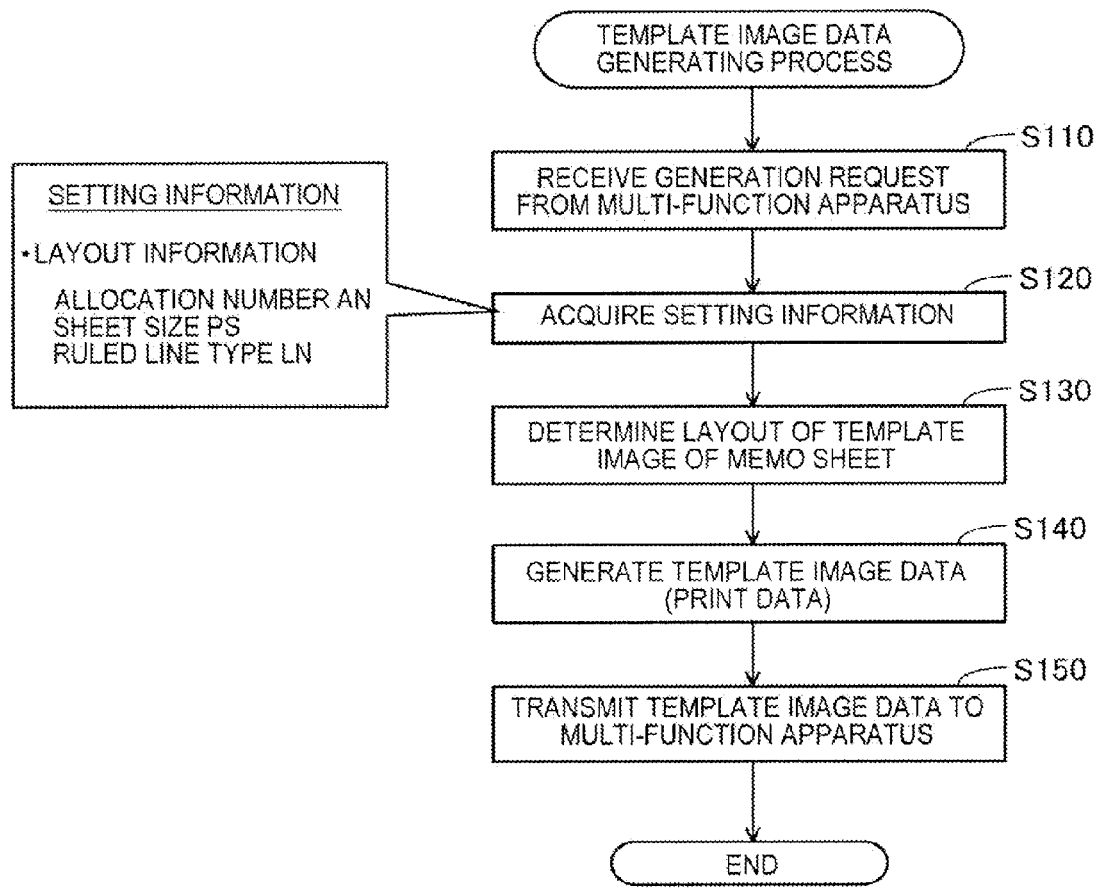
FIG. 2 is a flow chart illustrating a template image data generating process.

FIG. 2 is a flow chart illustrating a template image data generating process. The template image data generating process is a process of generating template image data for generating a memo sheet. If the image process server 200 receives a generation request to request generation of template image data, the template image data generating process is performed by the template image generating unit 50 of the image process server 200. The template image acquiring unit 314 of the multi-function apparatus 300 transmits the generation request to the image process server 200 according to an instruction of the user of the multi-function apparatus 300. For example, the user's instruction is a print instruction to cause the printing unit 370 of the multi-function apparatus 300 to print a template image of a memo sheet.

If receiving the generation request from the multi-function apparatus 300 in Step S110, in Step S120, the template image generating unit 50 acquires setting information included in the received generation request. As shown in FIG. 2, the setting information includes layout information designated by the user. The layout information includes an allocation number AN, a sheet size PS, and a ruled line type LT to be described below. The sheet size PS is the size of sheet predetermined to be used for printing a template image, and is any one of general sheet sizes for printing, such as A4, A3, B5, B4, and so on. Examples of the ruled line type LT include ruled lines of writing sheet (horizontal ruled lines), ruled lines of graph sheet or manuscript sheet (square ruled lines), and so on. All or part of the layout information may be predetermined and fixed values. The setting information may include other information such as keyword information, in addition to the layout information.

In Step S130, the template image generating unit 50 uses the setting information including the layout information to determine the layout of a template image and the contents of unit images 10 to be disposed in the template image. In Step S140, the template image generating unit 50 generates template image data having the unit image 10 representing the determined contents and disposed in the determined layout.

Figure 3A:
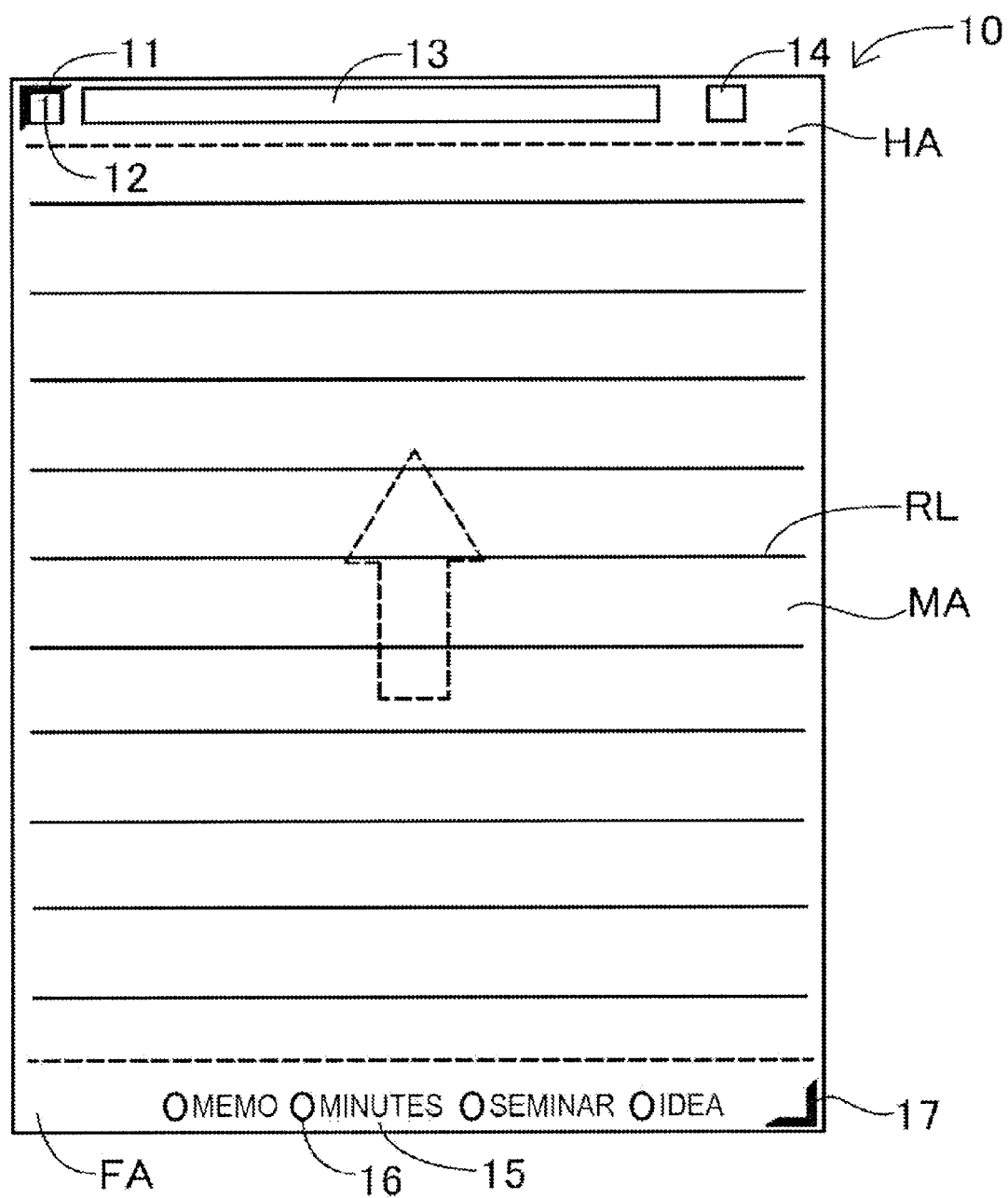
FIGS. 3A to 3C are views illustrating examples of a template image TI.
Figure 3B:
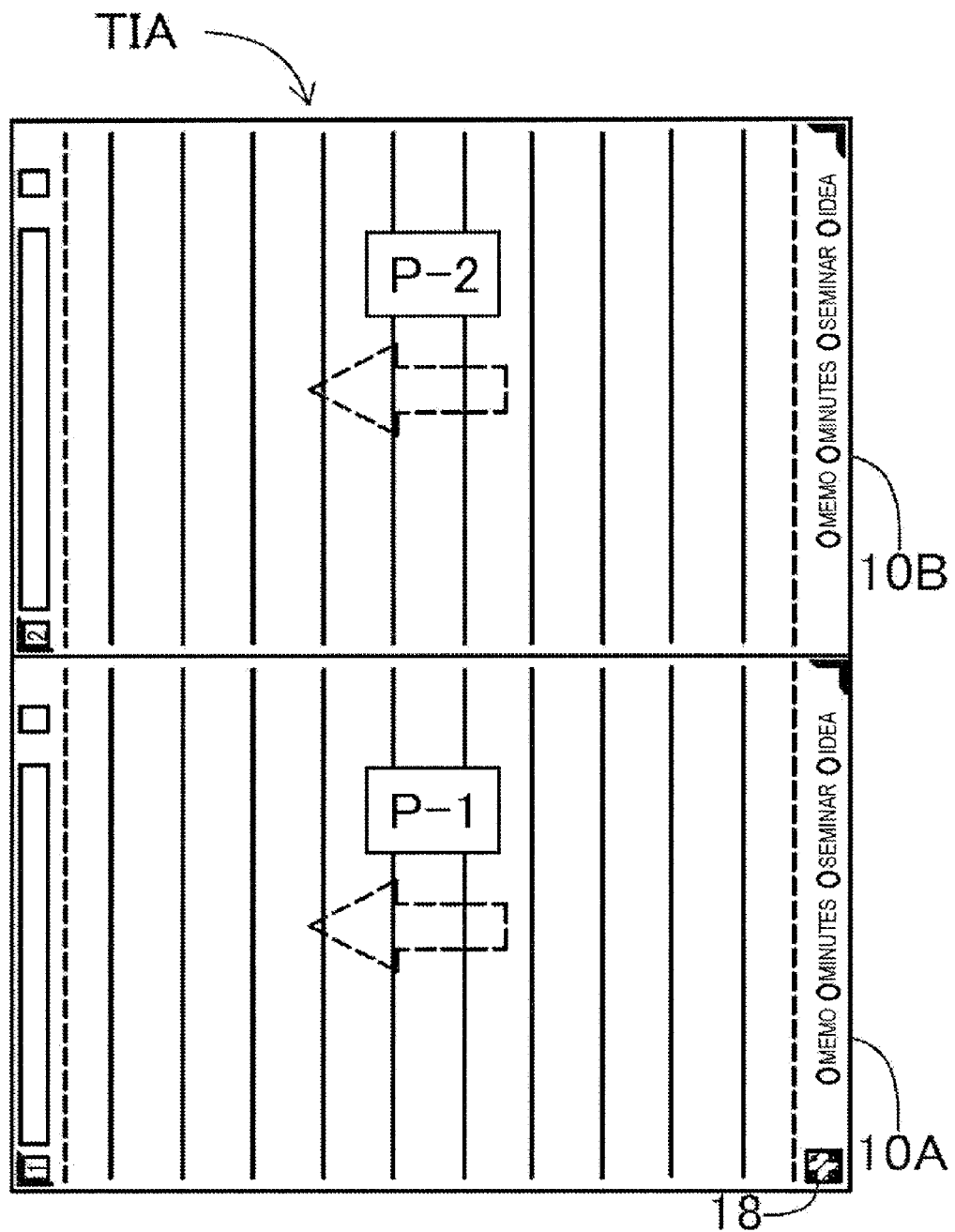
Figure 3C:
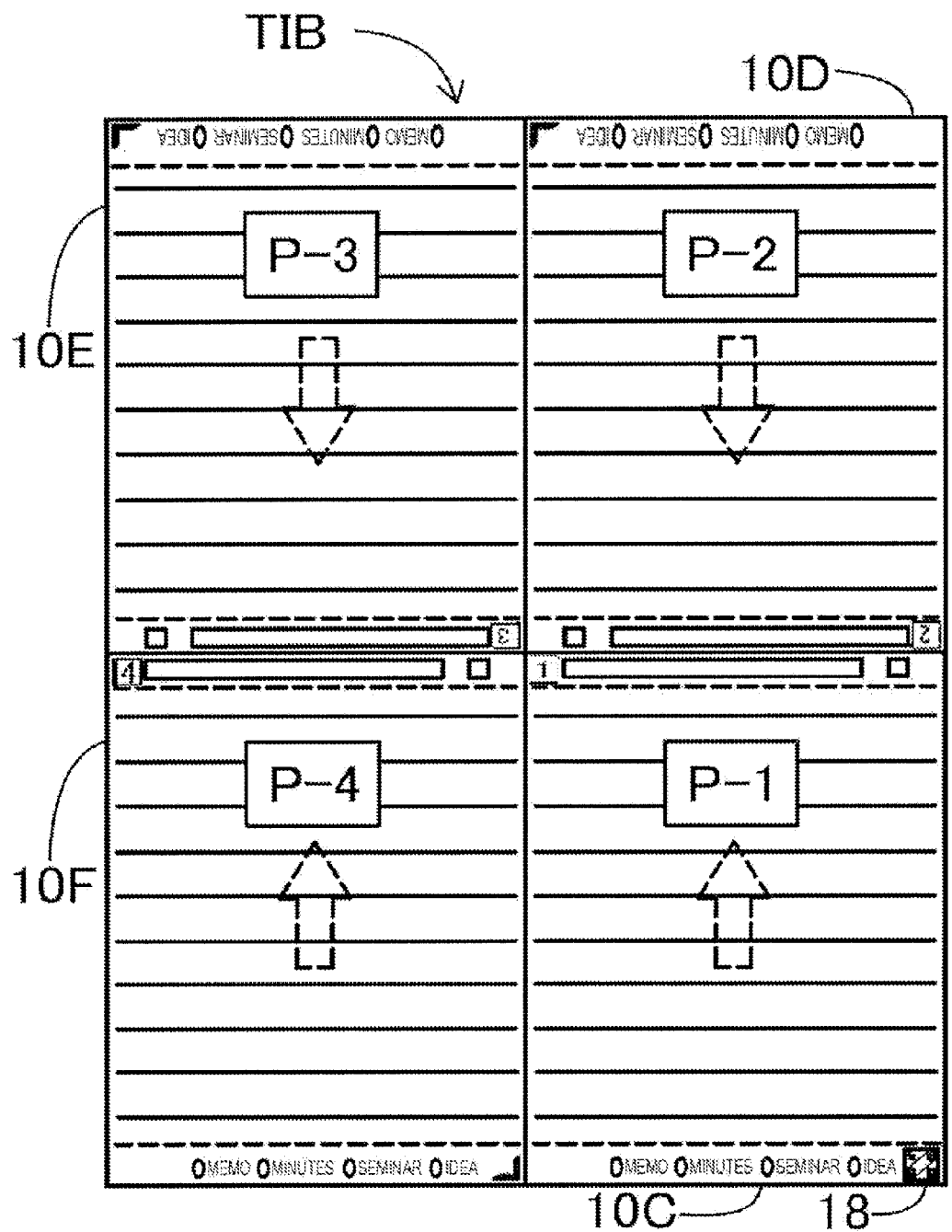
Figure 4A:
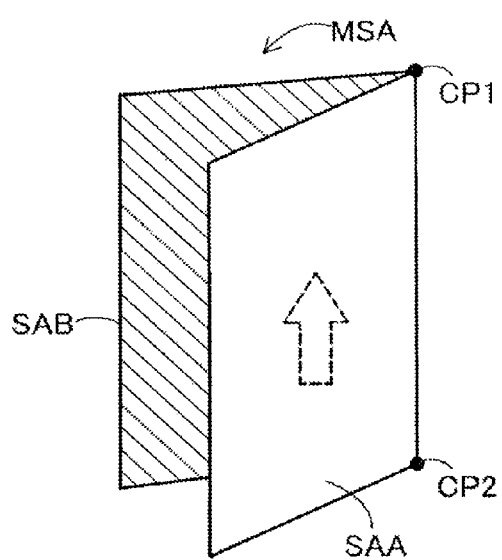
FIGS. 4A and 4B are views illustrating use modes of a memo sheet MS.
Figure 4B:
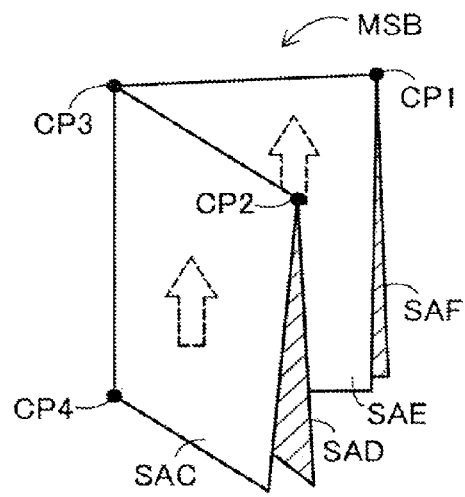

FIGS. 3A to 3C are views illustrating examples of a template image TI which is represented by template image data. FIGS. 4A and 4B are view illustrating use modes of a memo sheet MS. FIG. 3A shows an example of the unit image 10. FIG. 3B shows a first type of template image TIA having an allocation number AN of 2, and FIG. 3C shows a second type of template image TIB having an allocation number AN of 4. FIG. 4A shows a use mode of a first type of memo sheet MSA having the first type of template image TIA printed thereon, and FIG. 4B shows a use mode of a second type of memo sheet MSB having the second type of template image TIB printed thereon. Incidentally, in a case of distinguishing specific types of template images TI and memo sheets MS, alphabets (for example, 'A' or 'B') are further added to the ends of their reference symbols.

As shown in FIGS. 3B and 3C, a template image TI includes (AN-number of) unit images 10, the number of which corresponds to the allocation number AN. In other words, in a case of printing the template image TI on a sheet to generate a memo sheet MS, the allocation number AN is the number of unit images 10 to be printed on (one side of) one sheet. The first type of template image TIA includes two unit images 10A and 10B, and the second type of template image TIB includes four unit images 10C, 10D, 10E, and 10F. Incidentally, in a case of distinguishing specific unit images 10, alphabets (for example, 'A' or 'B') are further added to the ends of their reference symbols. This is similarly applied to areas SA of the memo sheets MS to be described below.

The memo sheet MS having the template images TI printed thereon is folded as shown in FIGS. 4A and 4B and is used in the folded state. Specifically, the first type of memo sheet MSA (FIG. 4A) is folded along a first folding line which is a line connecting the middle points CP1 and CP2 of two long sides of rectangular sheet, one time, and is used in the folded state. The second type of memo sheet MSB (FIG. 4B) is folded along a second folding line which is a line connecting the middle points CP3 and CP4 of two long sides of the sheet folded one time (which were short sides before the folding), one more time, and is used in the folded state. By the folding lines when the memo sheet MS has been folded, one face of the memo sheet MS is divided into plural areas SA. Specifically, one face of the first type of memo sheet MSA is divided into two areas SAA and SAB (FIG. 4A), and one face of the second type of memo sheet MSB is divided into four areas SAC, SAD, SAE, and SAF (FIG. 4B).

It is assumed that each area SA of the memo sheet MS is used as a memo area for one page. For example, in the first type of memo sheet MSA, the area SAA is used as a memo area of a first page, and the area SAB is used as a memo area of a second page. In the second type of memo sheet MSB, the four areas SAC, SAD, SAE, and SAF are used as memo areas of first to fourth pages, respectively.

The unit image 10 is printed to each of the areas SA of the memo sheet MS, one per area. That is, one unit image 10 is configured to be convenient when used as a memo area of one page. Specifically, as shown in FIG. 3A, one unit image 10 includes a ruled line area MA which includes ruled lines RL of the type designated by the layout information, a header area HA which is adjacent to the upper side of the ruled line area MA, and a footer area FA which is adjacent to the lower side of the ruled line area MA. The ruled line area MA is also called a body text area, and the header area HA and the footer area FA are also called peripheral areas positioned at the periphery of the ruled line area MA. The ruled line area MA is a substantially blank area which includes the ruled lines RL but does not include any substantial objects such as characters, figures, and drawings.

The header area HA includes a top marker 11, a page information area 12, a title area 13, and an unnecessity check box 14. The top marker 11 may be disposed at the left corner of the header area HA (the upper left corner of the unit image 10), and have a shape including a part parallel to a horizontal direction, and a part parallel to a vertical direction (a shape obtained by rotating the character "L" 90 degrees clockwise). In the page information area 12, the page number of the unit image 10 in the template image TI is written. The title area 13 is an area for allowing the user to write a title for each unit image 10. The unnecessity check box 14 is an area for allowing the user to write a check mark in a case where it is not necessary to store the unit image 10.

The footer area FA includes plural keywords 15, mark areas 16 which correspond to the plural keywords 15, respectively, and a bottom marker 17. The keywords 15 are keywords which the user can associate with the unit image 10. The specific contents of the keywords 15 (such as 'MEMO', 'MINUTES', 'SEMINAR', and 'IDEA') may be determined in advance, or may be specified according to the keyword information which can be included in the setting information designated by the user. The mark areas 16 are areas which the user can fill to specify all or some of the plural keywords 15. The bottom marker 17 may have a shape obtained by rotating the top marker 11 180 degrees clockwise. As can be seen from the above, even if the ruled line area MA is substantially blank, in other words, even if the contents of the ruled line area MA has not been determined, candidates of the keywords 15 to be associated are printed onto the memo sheet MS having the template image TI printed thereon.

Each unit image 10 is disposed inside the template image TI such that it is convenient in a case of using a memo sheet MS having the template image TI printed thereon in a folded state as described with reference to FIGS. 4A and 4B.

Specifically, as shown in FIG. 3B, two unit images 10A and 10B of the first type of template image TIA are disposed in areas corresponding to the two areas SAA and SAB shown in FIG. 4A, respectively. The two unit images 10A and 10B are disposed in the same direction inside the first type of template image TIA such that an upper side (an arrow in FIG. 4A) which is assumed in a case where the first type of template image is used in the folded state and the upper sides (arrows in FIG. 3B) of the two unit images 10A and 10B match with each other.

Also, as shown in FIG. 3C, four unit images 10C to 10F of the second type of template image TIB are disposed in areas corresponding to the four areas SAC to SAF shown in FIG. 4B, respectively. Two unit images 10C and 10F and two unit images 10D and 10E are disposed in opposite direction to each other inside the second type of template image TIB such that an upper side (an arrow in FIG. 4B) which is assumed in a case where the second type of template image TIB is used in the folded state and the upper sides of the four unit images 10C to 10F (arrows in FIG. 3C) match with each other. In other words, the two unit images 10C and 10F and the two unit images 10D and 10E are in opposite directions to each other with a line inside the second type of template image TIB corresponding to the above-mentioned first folding line and interposed between the two unit images 10C and 10F and the two unit images 10D and 10E.

In FIGS. 3B and 3C, numerals (following "P-") shown in the unit images 10 show page numbers assigned to the corresponding unit images 10 inside the template image TI. As can be seen from those numerals, the page numbers of the unit images 10 are assigned according to an order of use which is assumed in the above-mentioned folded state. As described above, each page number is shown in the page information area 12 (FIG. 3A).

Also, the template image TI may include a QR code (registered trademark) 18 as shown in FIGS. 3B and 3C. The QR code includes various information usable in a division document generating process to be described below.

As can be appreciated from the above explanation, the sizes of unit images included in one template image TI are the same each other. In a case where the sheet size is fixed, as the allocation number AN increases, the sizes of unit images 10 decrease, and as the allocation number AN decreases, the sizes of unit images 10 increase. Specifically, in the case where the sheet size is fixed, if the allocation number AN doubles, the area of each unit image 10 becomes nearly half. Also, in a case where the allocation number AN is fixed, that is, in a case where the number of unit images 10 to be included in one template image TI is fixed, as the sheet size increases, the size of each unit image 10 increases, and as the sheet size decreases, the size of each unit image 10 decreases. Specifically, if the sheet area doubles, the area of each unit image 10 also doubles. Also, as can be appreciated from the explanation on the folded states of FIGS. 4A and 4B, in the present illustrative embodiment, the number of unit images 10 to be included in one template image TI (the allocation number AN) has a value of the Z power of 2 (here, Z is a natural number). In other words, the allocation number AN has any one of 2, 4, 8, 16, 32, . . . .

If the template image data is generated in Step S140, in Step S150, the template image generating unit 50 transmits the template image data to the multi-function apparatus 300 in response to the generation request from the multi-function apparatus 300, and terminates the process. As the transmitted template image data, data of various formats can be used, for example, print data subjected to a rasterizing process or a halftone process may be used, and vector data such as image data described in a page description language may also be used.

The apparatus control unit 312 of the multi-function apparatus 300 uses the received template image data to print the template image TI on a sheet to generate a memo sheet MS. The generated memo sheet MS can be used by the user.

A-2-2: Division Document Generating Process

Figure 5:
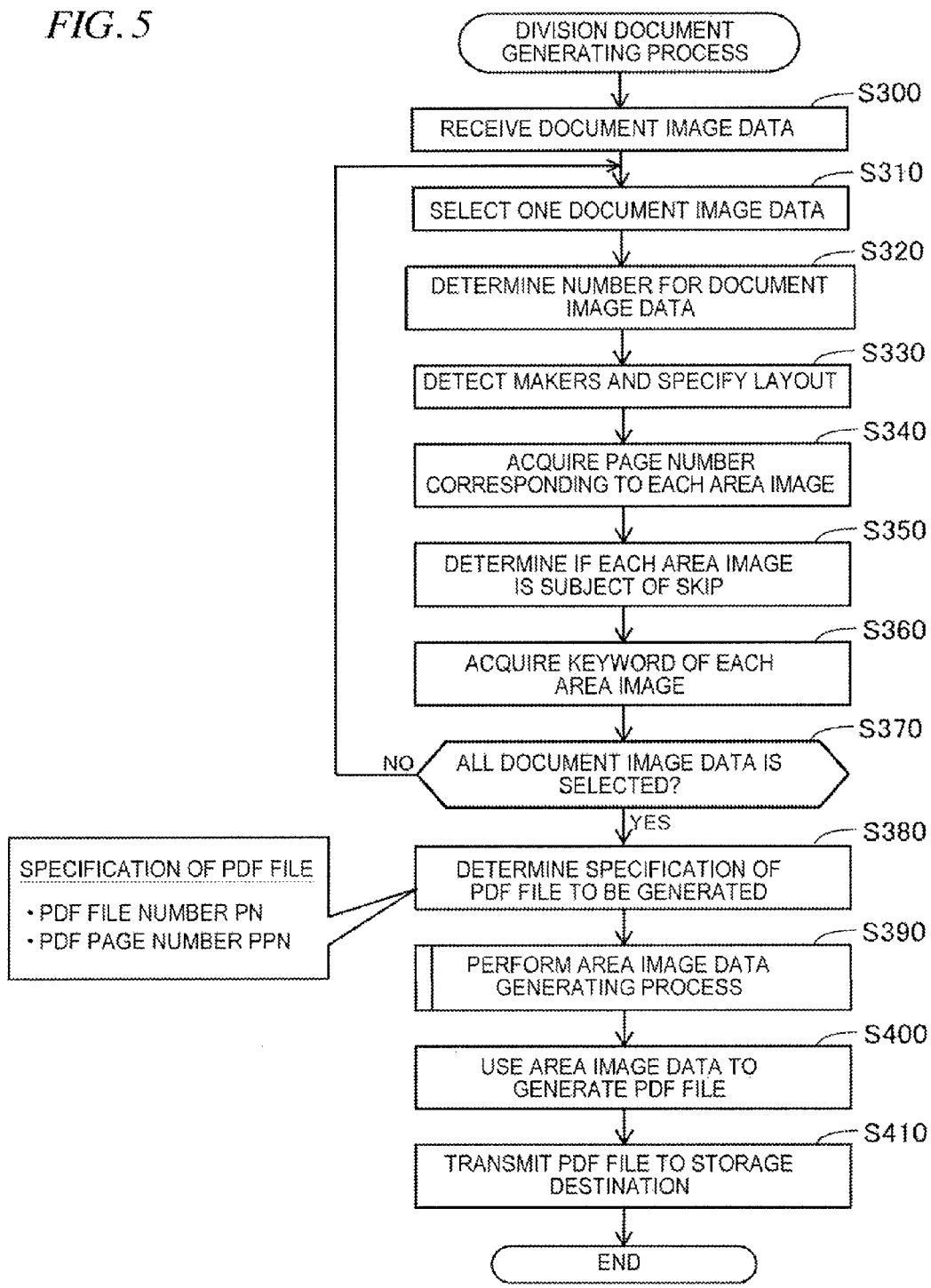
FIG. 5 is a flow chart illustrating a division document generating process.

FIG. 5 is a flow chart illustrating the division document generating process. The document generating process is a process of generating a file for storing image data representing the contents of the memo sheet MS having various information (referred to as write information) written (handwritten) thereon by the user. The document generating process is performed by the document image processing unit 100 of the image process server 200 if the image process server 200 receives document image data from the multi-function apparatus 300. The image reading unit 380 of the multi-function apparatus 300 reads the written memo sheet MS to generate document image data. The document image data may be stored in one transmission file to be transmitted to the image process server 200. In a case where there are plural document image data to be transmitted, the plural document image data are disposed or arranged in a transmission file in an order of generation (an order of read). That is, the plural document image data are transmitted such that the generation order specifying unit 140 of the image process server 200 can specify the order of generation of the plural document image data.

Figure 6A:
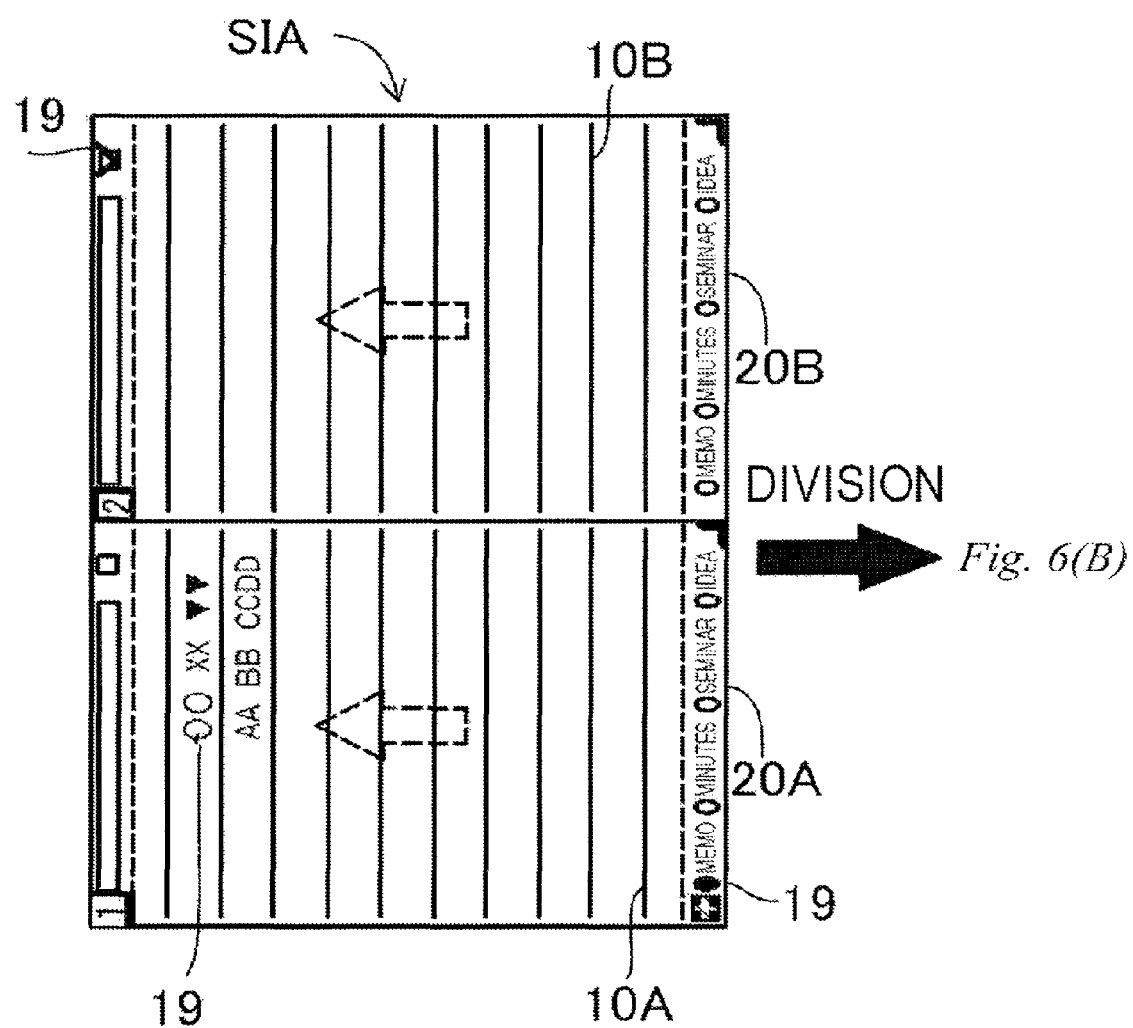
Figure 6C:
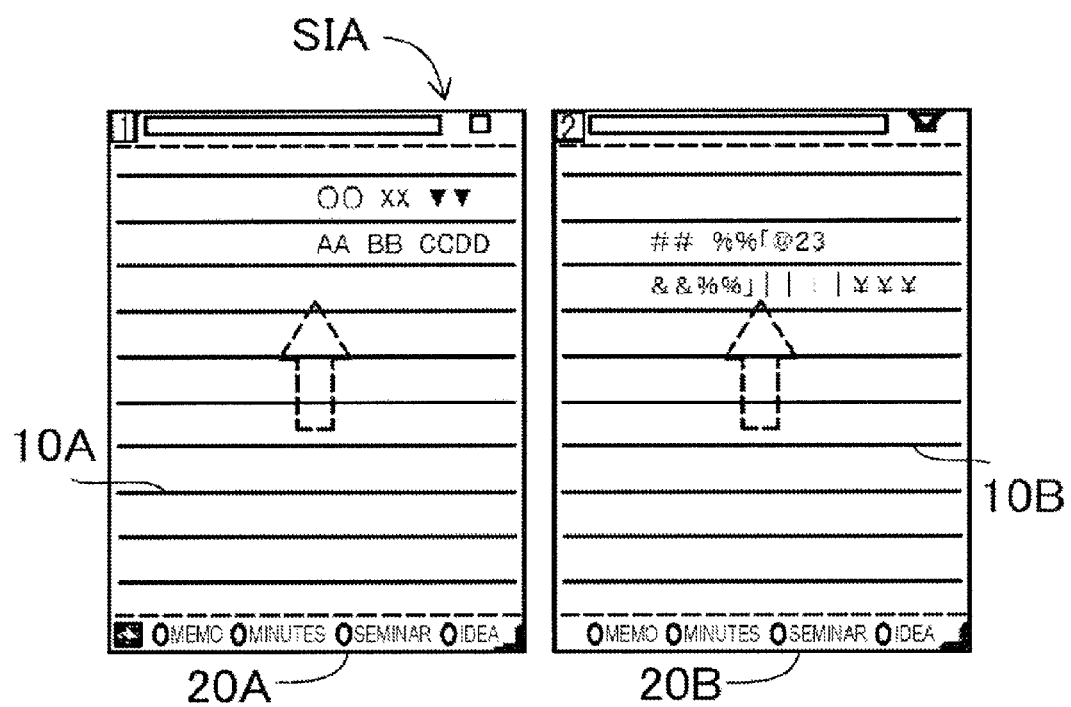
Figure 7A:
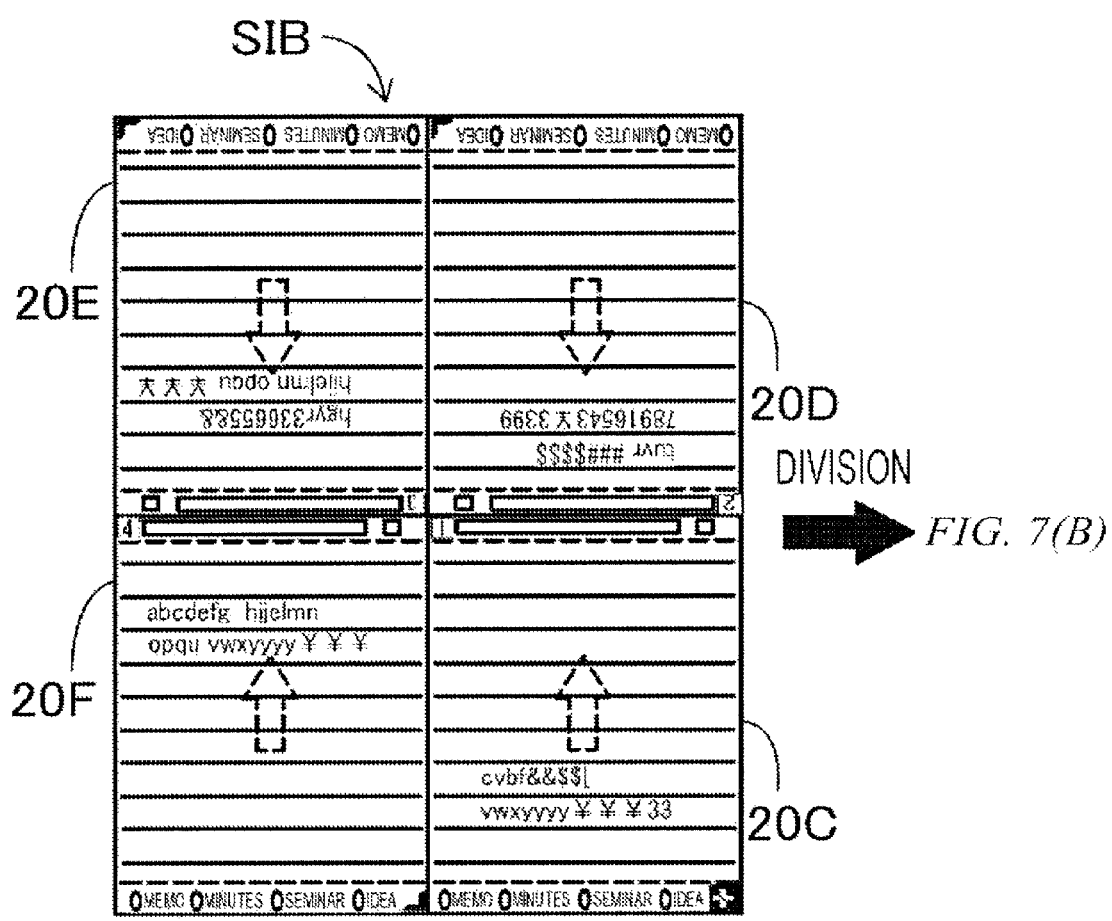

FIGS. 6A-6C and 7A-7C are explanatory views illustrating the division document generating process. First, a document image SI which is represented by document image data will be described. FIG. 6A shows a first type of document image SIA which is represented by a first type of document image data generated by reading a first type of memo sheet MSA, and FIG. 7A shows a second type of document image SIB which is represented by a second type of document image data generated by reading a second type of memo sheet MSB. Incidentally, in a case of distinguishing document images SI of specific types, alphabets (for example, 'A' or 'B') are further added to the ends of their reference symbols. A document image SI includes plural area images 20 corresponding to plural unit images 10 which is included in one template image TI printed on one memo sheet MS. Therefore, the number of area images 20 which are included in one document image SI is the same as the number of unit images 10 which are included in one template image TI, and is the Z power of 2 (here, Z is a natural number), specifically, any one of 2, 4, 8, 16, 32, . . . . Also, the sizes of multiple area images 20 which are included in one document image SI are almost the same, and are almost the same as the sizes of corresponding unit images 10. Specifically, the first type of document image SIA shown in FIGS. 6A-6C includes two area images 20A and 20B, and the second type of document image SIB shown in FIGS. 7A-7C includes four area images 20C to 20F. Incidentally, in a case of distinguishing specific area images 20, alphabets (for example, 'A' or 'B') are further added to the ends of their reference symbols. The area image 20 may include corresponding unit image 10 (see FIGS. 3A to 3C) and include write information 19 (also referred to as write image) written on the memo sheet MS by the user. The write information 19 can be included in the ruled line area MA of each unit image 10 (see FIG. 3A), and can also be included in the peripheral areas of each unit image 10 (the header area HA and the footer area FA (see FIG. 3A)). Specifically, the write information 19 written by the user includes characters written in the ruled line area MA, main information such as figures (contents to be stored), and various sub-information (such as checking of the unnecessity check box 14, filling of the mark areas 16, and writing in the title area 13) (FIG. 6A). Hereinafter, a case where three document image data each of which represents a document image SI including four area images 20 are processed will be described as an example. In this case, twelve area images 20 are processed.

If the document image acquiring unit 110 receives one or more document image data from the multi-function apparatus 300 in Step S300, in Step S310, the document image processing unit 100 selects one document image data to be processed. In a case where there are plural document image data to be processed, the document image data are selected one by one in the order of generation of the document image data. For example, in a case where the document image data are arranged in the order of generation in a transmission file, the document image data are selected one by one in the order of arrangement in the transmission file.

In Step S320, the generation order specifying unit 140 determines a number for the selected document image data (a document image number SN). Here, document image numbers SN are numbers to specify the document image data, and are attached in the order of generation. In the present illustrative embodiment, since the document image data are selected in the order of generation in Step S320, the document image numbers SN are attached in the order of selection in Step S320. In other words, the document image numbers SN make it possible to specify the order of generation of the document image data.

In Step S330, the area image generating unit 160 detects markers included in the document image SI, and specifies the layout of the document image SI. Specifically, the image information acquiring unit 120 analyzes the document image data to detect the top marker 11 and bottom marker 17 (see FIGS. 3A to 3C) of each unit image 10 included in the document image SI. As the analyzing method to detect the markers, known pattern matching can be used. The area image generating unit 160 specifies the number and positions of area images 20 (which are the same as the number and positions of unit images 10) included in the document image SI, on the basis of positions where the markers 11 and 17 are detected.

In Step S340, the page number acquiring unit 130 acquires a page number (a document image page number SPN) corresponding to each area image 20 which is inside the document image SI and is represented by a document image data to be processed. Specifically, the page number acquiring unit 130 analyzes the document image data to acquire the page number included in the page information area 12 (see FIG. 3A) corresponding to each area image 20. The page number of each area image 20 may be included in the information embedded in the QR code 18 (see FIG. 3A) such that correspondence to the corresponding area image 20 can be specified. In this case, the page number acquiring unit 130 may read the QR code 18 to acquire a page number corresponding to each area image 20.

In Step S350, the document image processing unit 100 determines whether each area image 20 is a subject of skip. Specifically, the image information acquiring unit 120 analyzes the document image data to detect whether there is write information (specifically, a check mark) written in an unnecessity check box 14 (see FIG. 3A) included in each area image 20. The unnecessity condition determining unit 150 determines that an area image 20 corresponding to a unnecessity check box 14 having write information written therein is a subject of skip, and determines that an area image 20 corresponding to an unnecessity check box 14 having no write information written therein is not a subject of skip. An area image 20 determined as a subject of skip is excluded from objects to be stored in a PDF file to be generated later as will be described below.

In Step S360, the image information acquiring unit 120 acquires a keyword associated with each area image 20 (an associated keyword KW). Specifically, the image information acquiring unit 120 analyzes the document image data to detect whether there are write information (specifically, filling) written in plural mark areas 16 (see FIG. 3A) included in each area image 20. The image information acquiring unit 120 acquires keywords 15 (see FIG. 3A) corresponding to the mark areas 16 having write information written therein, as the associated keywords KW associated with corresponding area images 20. The contents of the keywords 15 corresponding to the mark areas 16 are specified on the basis of the predetermined correspondence between the positions of the mark areas 16 and the contents of the keywords 15. In a case where the correspondence between the mark areas 16 and the keywords 15 is not recognized by the image process server 200, the image information acquiring unit 120 may perform a known character recognition process (an OCR process) on areas represented by the keywords 15 of image data which are objects to acquire the contents of the keywords 15.

In Step S370, the document image processing unit 100 determines whether all document image data received from the multi-function apparatus 300 have been selected. In a case where there is any unselected document image data (NO in Step S370), the document image processing unit 100 returns to Step S310 to select a new document image data, and repeats the processes of Steps S320 to S360. Meanwhile, in a case where all document image data have been selected (YES in Step S370), the document image processing unit 100 proceeds to Step S380.

Also, various information acquired or specified until Step S370 are recorded in the management table MT temporarily generated in the volatile storage device 230. FIG. 8 is a view illustrating an example of the management table MT. In the management table MT, for each of the twelve area images 20 processed, the document image number SN, the document image page number SPN, skip information SK, a PDF file number PN, a PDF page number PPN, and the associated keyword KW are recorded. As described above, the document image number SN is specified in Step S320, and the document image page number SPN is acquired in Step S340. The skip information SK is information representing the result of the determination on whether each area image 20 is a subject of skip performed in Step S350. In the management table MT of FIG. 8, with respect to an area image 20 which is a subject of skip, as the skip information SK, information representing that the corresponding area image is a subject of skip is recorded, and with respect to an area image 20 which is not a subject of skip, any information is not recorded. As described above, the associated keyword KW is acquired in Step S360. The PDF file number PN and the PDF page number PPN have not been recorded until the process of Step S370 is terminated.

In Step S380, the file generating unit 170 determines a specification of a PDF file to be generated. Specifically, the file generating unit 170 determines a PDF file number PN and a PDF page number PPN for each area image 20 specified by the combination of a document image number SN and a document image page number SPN, on the basis of the information having been recorded in the management table MT (FIG. 8). Hereinafter, a description (SN-SPN) may be used to represent an area image 20 specified by the combination of a document image number SN and a document image page number SPN of the area image 20. For example, an area image 20 specified by the combination of a document image number SN of 1 and a document image page number SPN of 2 may be represented by an area image 20 of (1-2).

Specifically, PDF file numbers PN and the PDF page numbers PPN are determined using the order of arrangement of the twelve area images 20 in the management table MT, and the associated keyword KW of the twelve area images 20. As can be seen from FIG. 8, each of the twelve area images 20 is earlier in the order of arrangement as the corresponding area image 20 is earlier in the order of generation represented by the document image numbers SN, and in four area images 20 of the same document image SI, each area image 20 is earlier in the order of arrangement as the document image page number SPN of the corresponding area image 20 is smaller. First, an area image 20 determined as a subject of skip is excluded from the process, and with respect to the corresponding area image 20, any PDF file number PN and any PDF page number PPN are not attached. For two or more area images 20 (an area image group) which are consecutive in the order of arrangement of them, and have the same associated keyword KW, the same PDF file number PN is attached. Also, for two or more area images 20 having different associated keywords KW, different PDF file numbers PN are attached. In a case where there are two area images 20 having the same associated keyword KW, and an area image 20 having a different associated keyword KW is included in area images 20 positioned between the two area images 20 in the order of arrangement, different PDF file numbers PN are attached to the two area images 20. In the example shown in FIG. 8, five area images 20 of (1-1) to (2-1) are consecutive in the order of arrangement, and their associated keywords KW are the same as 'MINUTES'. Therefore, the PDF file numbers PN of the five area images 20 are determined to 1. Two area images 20 of (2-2) and (2-3) are consecutive in the order of arrangement, and their associated keywords KW are the same as 'MEMO'. Therefore, the PDF file numbers PN of the two area images 20 are determined to 2. Four area images 20 from (2-4) to (3-3) are consecutive in the order of arrangement, and their associated keywords KW are the same as 'IDEA'. Therefore, the PDF file numbers PN of the four area images 20 are determined to 3.

Also, the file generating unit 170 attaches PDF page numbers PPN beginning with 1 to one or more area images 20 having the same PDF file number PN, in the order of arrangement. Specifically, as shown in FIG. 8, to five area images 20 having PDF file numbers PN of 1, PDF page numbers PPN of 1 to 5 are attached in the order of arrangement. To two area images 20 having PDF file numbers PN of 2, PDF page numbers PPN of 1 and 2 are attached in the order of arrangement. To four area images 20 having PDF file numbers PN of 3, PDF page numbers PPN of 1 to 4 are attached in the order of arrangement.

In Step S390, the area image generating unit 160 performs an area image data generating process on the three document image data to generate area image data representing the twelve area images 20 included in the three document images SI. However, an area image data representing an area image 20 of (3-4) determined as a subject of skip may not be generated.

Figure 9:
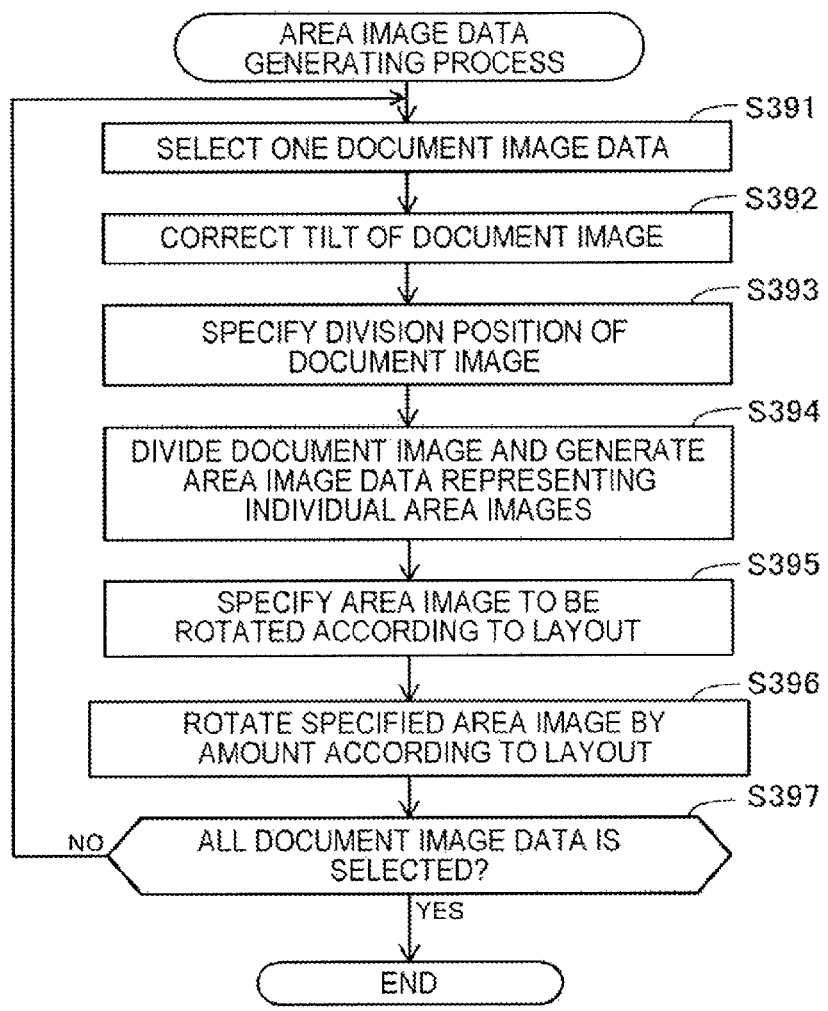
FIG. 9 is a flow chart illustrating an area image data generating process.

FIG. 9 is a flow chart illustrating the area image data generating process. In Step S391, the area image generating unit 160 selects one document image data to be processed. In Step S392, the area image generating unit 160 performs a tilt correcting process on the selected document image data to correct the tilt of a document image SI represented by the document image data. The tilt correcting process includes a process of computing a tilt angle based on the coordinates of the markers 11 and 17 included in the document image SI, and a rotating process of rotating the document image SI by the computed tilt angle. A specific computing method may be performed using a known technique.

In Step S393, the area image generating unit 160 uses the document image data subjected to the tilt correcting process to specify a division position in the document image SI. For example, the division position may be specified on the basis of the coordinates of the markers 11 and 17 included in the document image SI. In a case where the document image SI is a first type of document image SIA including two area images 20 as shown in FIG. 6B, a division position is a straight line connecting two middle points dividing two long sides of the first type of document image SIA almost equally, respectively. Also, in a case where the document image SI is a second type of document image SIB including four area images 20C to 20F as shown in FIG. 7B, division positions are a straight line connecting two middle points dividing two long sides of the second type of document image SIB almost equally, respectively, and a straight line connecting two middle points dividing two short sides of the second type of document image SIB almost equally, respectively.

In Step S394, the area image generating unit 160 divides the document image SI at the specified division position, and generates area image data representing individual area images 20 included in the document image SI. In the case where the document image SI is a first type of document image SIA including two area images 20 as shown in FIG. 6B, two area image data representing the two area images 20A and 20B are generated. Also, in the case where the document image SI is a second type of document image SIB including four area images 20C to 20F as shown in FIG. 7B, four area image data representing the four area images 20C to 20F are generated.

In Step S395, the area image generating unit 160 specifies an area image 20 to be rotated, according to the layout of the document image SI. Specifically, in a case where the document image SI is the first type of document image SIA shown in FIGS. 6A-6C, all area images, that is, the two area images 20A and 20B are specified as area images to be rotated. In a case where the document image SI is the second type of document image SIB shown in FIGS. 7A-7C, some area images, that is, two area images 20D and 20E having document image page numbers SPN of 2 and 3 are specified as area images to be rotated.

In Step S396, the area image generating unit 160 performs the rotating process of rotating the specified area image 20 by an amount of rotation according to the layout, on the area image data representing the specified area image 20. Specifically, in the case where the document image SI is the first type of document image SIA shown in FIGS. 6A-6C, the two area images 20A and 20B are rotated 90 degrees clockwise. Also, if the reading direction of the image reading unit 380 during generating of document image data is reversed, a first type of document image SIA may be in an opposite direction to the state shown in FIG. 6B. In this case, the area image generating unit 160 needs only to rotate the two area images 20A and 20B 90 degrees counterclockwise. As a result, the two area image data are converted to represent the two area images 20A and 20B in a state where the area images are oriented in appropriate directions. A state where an image is oriented in an appropriate direction may be a state where the image is oriented in a direction in which a user feels that the image should be oriented upward as seeing the image. For example, in a case of a character image, a state where the image is oriented in an appropriate direction is a state where the upper sides of characters in the character image are oriented upward. For example, in a case of a unit image 10 included in an area image 20, a state where a direction shown by a broken line arrow in FIG. 3A is oriented upward is a state where the unit image is oriented in an appropriate direction.

Figure 7C:
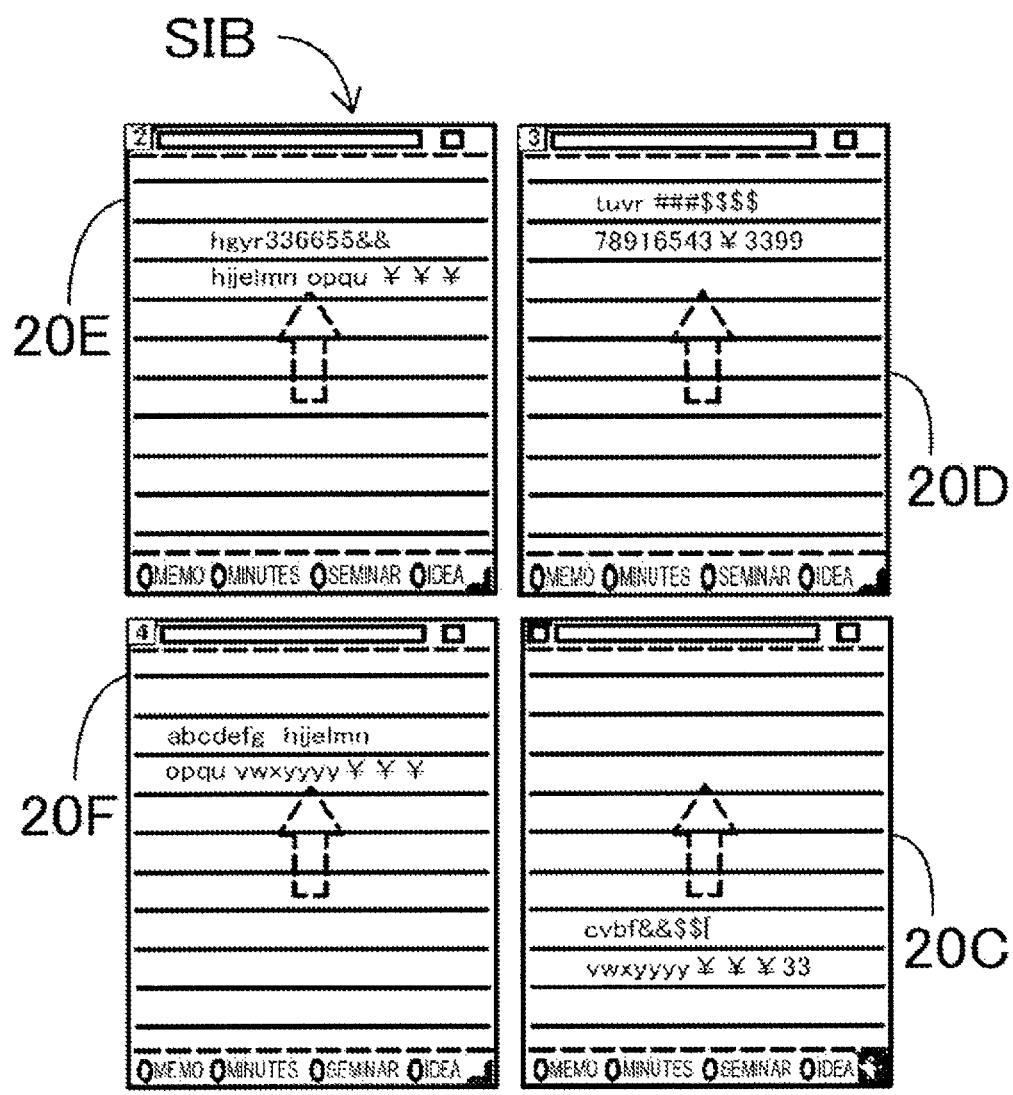

Similarly, in a case where the document image SI is the second type of document image SIB shown in FIGS. 7A-7C, the two area images 20D and 20E are rotated 180 degrees. As a result, the four area images 20C to 20F are oriented in the same direction, and the four area image data are converted such that the four area images 20C to 20F are oriented in appropriate directions. Also, if the reading direction of the image reading unit 380 during generating of document image data is reversed, a second type of document image SIB may be in an opposite direction to the state shown in FIG. 7B. In other words, in the document image SIB, the area images 20C and 20F corresponding to page numbers of 1 and 4 may be positioned on the upper side in FIGS. 7A-7C, and the area images 20D and 20E corresponding to page numbers of 2 and 3 may be positioned on the lower side in FIGS. 7A-7C. In this case, the area image generating unit 160 needs only to rotate the two area images 20C and 20F 180 degrees.

In Step S397, the area image generating unit 160 determines whether all document image data have been selected. In a case where there is any unselected document image data (NO in Step S397), the area image generating unit 160 returns to Step S391 to select a new document image data, and repeat the processes of Steps S392 to S396. Meanwhile, in a case where all document image data have been selected (YES in Step S397), the area image generating unit 160 terminates the area image data generating process.

If the area image data generating process terminates, in Step S400 of FIG. 5, the file generating unit 170 uses the plural generated area image data to generate a file in a portable document format (PDF) (a PDF file). The PDF file is a file having the concept of pages, and can store one or more image data in association with an arbitrary page. In the PDF file, with respect to an image represented by each image data associated with a page, it is possible to designate the layout position on the page, a layout angle, and so on. The user can use a browsing program (viewer) to browse images represented by the image data stored in the PDF file like plural pages of sheets, on a display.

Figures 10A, 10B:
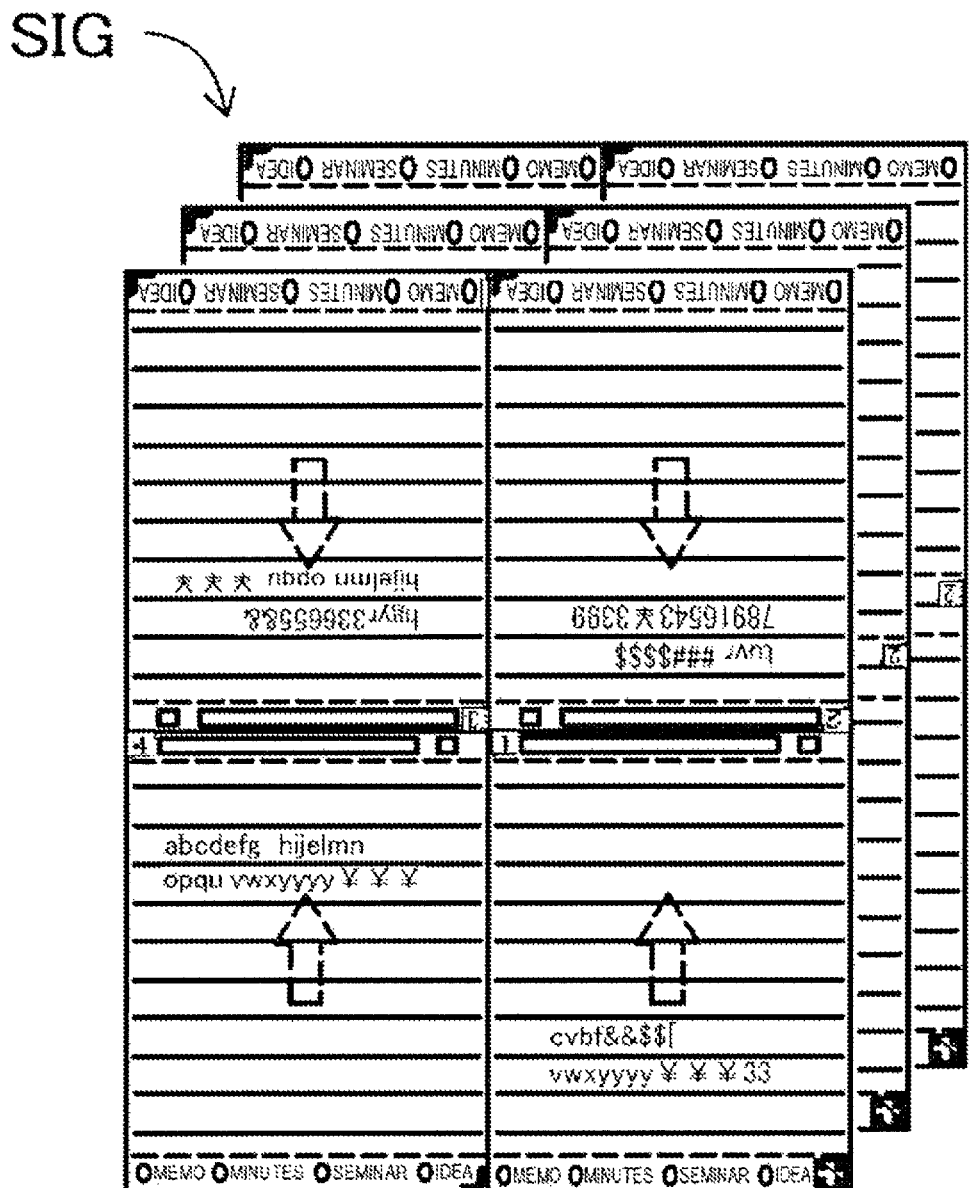
FIGS. 10A and 10B are views illustrating generation of a PDF file.

FIGS. 10A and 10B are views illustrating generation of a PDF file. Specifically, the file generating unit 170 generates three PDF files PFA, PFB, and PFC according to the PDF file number PN and the PDF page number PPN recorded for each area image 20 in the management table MT shown in FIG. 8. In the PDF file PFA, five area image data having PDF file numbers PN of 1 are stored. Five area images 20 represented by the five area image data stored in the PDF file PFA are disposed in pages of corresponding PDF page numbers PPN. Similarly, in the PDF file PFB, two area image data having PDF file numbers PN of 2 are stored, and the two area image data are disposed in pages of corresponding PDF page numbers PPN. In the PDF file PFC, four area image data having PDF file numbers PN of 3 are stored, and the four area image data are disposed in pages of corresponding PDF page numbers PPN. Here, an area image data corresponding to one area image 20 determined as a subject of skip is not stored in the generated PDF files.

As a result, among the twelve area images 20 included in an image group SIG (FIGS. 10A and 10B) composed of the three document images SI, eleven area images 20 except for one area image 20 determined as a subject of skip are classified into and stored in the three PDF files PFA, PFB, and PFC (FIG. 10B).

In Step S410 of FIG. 5, the document image processing unit 100 transmits the three PDF files PFA, PFB, and PFC to a storage destination, and terminates the division document generating process. In the present illustrative embodiment, the storage destination is the storage server 500. The document image processing unit 100 associates user identification information (specifically, a user ID for using the storage server 500) with the three PDF files PFA, PFB, and PFC, and transmits them to the storage server 500. The CPU 510 of the storage server 500 stores the three PDF files PFA, PFB, and PFC in a storage unit (not shown) of the storage server 500. The user can use a client device such as the personal computer 400 or a portable terminal (not shown) to access to the PDF files PFA, PFB, and PFC stored in the storage server 500.

According to the present illustrative embodiment described above, it is possible to generate PDF files including plural area images 20 of a document image SI disposed in different pages. Therefore, it is possible to store the document image SI including the plural area images 20 in a convenient form.

Also, the page number acquiring unit 130 acquires plural page number information (specifically, numerals in page information areas 12 (FIGS. 3A to 3C)) corresponding to plural area image data by image analysis. Then, the file generating unit 170 generates PDF files including the area image data disposed in the acquired page number order (FIGS. 8 and 10). Therefore, it is possible to generate convenient PDF files including the area image data disposed in the page number order.

Further, in the present illustrative embodiment, the document image processing unit 100 generates N-number of (eleven in the examples of FIGS. 8 and 10) area image data, and generates M-number of (three in the examples of FIGS. 8 and 10) PDF files each of which includes one or more area image data of the N-number of area image data. At least one file (three PDF files in the examples of FIGS. 8 and 10) of the M-number of PDF files includes two or more area images 20 corresponding to two or more area image data of the N-number of area image data and disposed in different pages. That is, it is possible to use document image data to generate two or more PDF files. As a result, it is possible to generate a convenient number of PDF files according to document image data. Also, it is preferable that N should be an integer equal to or greater than 3, and it is preferable that M should be an integer from 2 to (N−1). It can be seen from FIG. 8 that two area images 20 corresponding to two area image data included in the PDF file PFB are area images having consecutive page numbers (document image page numbers SPN) in the document image SI.

The image information acquiring unit 120 analyzes the document image data to acquire plural associated keywords KW corresponding to the plural area image data. The document image processing unit 100 can use the plural associated keywords KW to generate the PDF file PFA including plural area image data corresponding to plural area images 20 having associated keywords KW of 'MINUTES', and the PDF file PFB including plural area image data corresponding to plural area images 20 having associated keywords KW of 'MEMO' (FIGS. 8 and 10). That is, it is possible to use specific type information such as an associated keyword KW included in each area image 20 to generate plural PDF files. Therefore, it is possible to store a document image SI in a more convenient form.

The document image acquiring unit 110 acquires two ore more document image data (for example, document image data having document image numbers SN of 2 (FIG. 8)) including first document image data representing first document images (for example, document image data having document image numbers SN of 1 (FIG. 8)) and second document image data representing second document images. Then, the area image generating unit 160 uses the first document image data to generate P-number of (for example, four (FIG. 8)) first area image data (for example, four area image data which are generated by dividing document image data having document image numbers SN of 1) representing P-number of area images 20 included in the first document images, respectively. The area image generating unit 160 uses the second document image data to generate P-number of second area image data (for example, four area image data which are generated by dividing document image data having document image numbers SN of 2) representing P-number of area images 20 included in the second document images, respectively.

Also, the file generating unit 170 generates files (for example, the three PDF files PFA, PFB, and PFC (FIGS. 10A and 10B)) which include the P-number of first area image data of the first document images and the P-number of second area image data of the second document images disposed in 2×P-number of different pages. As a result, it is possible to generate files including 2×P-number of area image data included in two or more document image data. In this case, the 2×P-number of area images 20 are disposed in the PDF files in the page order determined on the basis of first page number information, second page number information, and the order of generation of the first document image data and the second document image data (the order of document image numbers SN). Therefore, it is possible to store plural document images SI in a convenient form according to the order of generation and the page numbers.

A document image SI including four area images 20 includes first area images disposed in opposite directions to each other (for example, the area images 20C and 20F having page numbers of 1 and 4 (FIG. 7)), and second area images (for example, the area images 20D and 20E having page numbers of 2 and 3 (FIG. 7)). According to the present illustrative embodiment, the file generating unit 170 generates PDF files such that the first area images and the second area images are oriented in the same direction. As a result, it is possible to generate files capable of conspicuously displaying document images including first area images and second area images disposed in opposite directions to each other in a document image SI.

Also, the unnecessity condition determining unit 150 determines whether each of plural area images satisfies a condition to become a subject of skip, on the basis of existence or non-existence of a check mark in an unnecessity check box 14 included in each area image 20. In a case where there is an area image 20 satisfying the skip condition, the file generating unit 170 generates PDF files which do not include an area image data representing the area image 20 satisfying the skip condition. As a result, in a case of displaying the contents of the PDF files, the unnecessary image is not displayed, and thus convenience is further improved.

B. Modification (1) In the above-mentioned illustrative embodiment, a page number is printed in the page information area 12. Alternatively, the page information area 12 may be printed as a blank, and the user may write a page number therein. In this case, the user can easily designate a page, so that convenience can be improved.

(2) In the above-mentioned illustrative embodiment, as the specific type information, the associated keywords KW are used to determine the number of PDF files to be generated, and area image data to be stored in each PDF file. The specific type information is not limited to the associated keywords KW, but may be a title written in the title area 13. Here, as shown in Modification (1), in a case where the user can write a page number, as the specific type information, the page number written by the user may be used. For example, in a case where four page numbers written in four page information areas 12 of four area images 20 included in a second type of memo sheet MSB are 1, 2, 1, and 2, respectively, and a pair of 1 and 2 is written in red, and the other pair of 1 and 2 is written in blue, the file generating unit 170 may generate a file corresponding to the page numbers written in red, and a file corresponding to the page numbers written in blue.

(3) In the above-mentioned illustrative embodiment, the file generating unit 170 does not store an area image data representing an area image 20 satisfying the skip condition, in PDF files. Alternatively, the file generating unit 170 may store an area image data representing an area image 20 satisfying the skip condition, in a PDF file, and store information (comment) representing that the area image 20 satisfying the skip condition will not be disposed (displayed) in any page, in the header of the PDF file. Even in this case, in a case of displaying the contents of the PDF file, the unnecessary image is not displayed. Also, the skip condition may be whether the page information area 12 is filled, whether an "X" mark larger than a reference is written in the ruled line area MA, or whether any information is not actually written in the ruled line area MA by the user. Generally, it is preferable that the unnecessity condition determining unit 150 determine whether each of plural area images satisfies a specific skip condition, on the basis of write information of a specific area included in each of plural area images, and in a case where a specific area image satisfying the specific skip condition is included, the file generating unit 170 generate files such that the specific area image will not be displayed.

(4) In Step S396 of the above-mentioned illustrative embodiment, the area image generating unit 160 performs the rotating process of rotating a specific area image 20 by an amount of rotation (angle) according to the layout. Alternatively, the file generating unit 170 may store an area image data representing the specific area image 20, in a PDF file, without performing the rotating process, and store information representing that the specific area image 20 will be rotated by the amount of rotation according to the layout and be displayed in the rotated state, in the header of the PDF file. Even in this case, the file generating unit 170 can generate a PDF file such that all area images represented by plural area image data in the PDF file are displayed in the same direction.

(5) The file generating unit 170 may generate files having other file formats, in place of PDF files. Other file formats have the concept of pages, and may include file formats in which it is possible to dispose plural image data in a plural different pages, for example, a XML Paper Specification (XPS) format.

(6) The image reading unit for generating document image data needs only to be a device for optically reading a document. Therefore, the image reading unit is not limited to the scanner of the illustrative embodiment, but may be a digital camera.

(7) In the above-mentioned illustrative embodiment, the image information acquiring unit 120 analyzes document image data representing a document image SI to perform acquisition of various information, such as detection of the markers 11 and 17, and detection of existence or non-existence of write information into the mark areas 16 and the unnecessity check box 14. Alternatively, the image information acquiring unit 120 may analyze area image data generated by dividing the document image SI by the area image generating unit 160 to acquire the same various information. The image information acquiring unit 120 may analyze at least one of the document image data and the area image data to acquire the same various information.

(8) The function of the document image processing unit 100 of the image process server 200 in the above-mentioned illustrative embodiment may be provided in the multi-function apparatus 300. In this case, the multi-function apparatus 300 uses the function of the document image processing unit 100 which the multi-function apparatus 300 has, to perform the above-mentioned process on the document image data which the image reading unit 380 has generated in response to an instruction of the user to generate a PDF file. Also, the personal computer 400 may have the function of the document image processing unit 100. The PDF file storage destination is not limited to the storage server 500, but may be a storage device included in the case of the personal computer 400 or the multi-function apparatus 300, a memory card such as a USB memory connected to the personal computer 400 or the multi-function apparatus 300, or the image process server 200.

(9) The image process server 200 is not limited to a device housed in one casing, but may be a device configured by plural computers housed in individual casings (so-called cloud server).

(10) A part of a configuration implemented by hardware in the above-mentioned illustrative embodiment may be replaced with software, and in contrast, a part of a configuration implemented by software in the above-mentioned illustrative embodiment may be replaced with hardware.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. An image processing apparatus comprising:
   a processor; and
   memory storing computer readable instructions, when executed by the processor, causing the apparatus to function as:
   a document image acquiring unit configured to acquire document image data which is generated by optically reading a document and represents a document image;
   an area image generating unit configured to use the document image data so as to generate plural area image data representing plural area images that are included in the document image;
   a keyword information acquiring unit configured to acquire plural keyword information corresponding to the plural area images by analyzing at least one of the document image data and the plural area image data; and a file generating unit configured to use the plural keyword information to generate plural files comprising a first file including two or more area image data of a first type among the plural area image data and a second file including one or more area image data of a second type among the plural area image data, wherein each of two or more first-type area images represented by the two or more area image data of the first type includes a first keyword as the keyword information, and wherein each of one or more second-type area images represented by the one or more area image data of the second type includes a second keyword as the keyword information.

2. The image processing apparatus according to claim 1, wherein the computer readable instructions, when executed by the processor, causing the apparatus to further function as:

a page number acquiring unit configured to acquire plural page number information corresponding to the plural area image data by analyzing at least one of the document image data and the plural area image data, and wherein the file generating unit is configured to use the plural page number information to generate the file including the plural area images disposed in an order of page numbers.

3. The image processing apparatus according to claim 1, wherein the document image includes a first area image and a second area image oriented in different directions, and wherein the file generating unit is configured to generate the file such that the first area image and the second area image are displayed in a same direction.

4. The image processing apparatus according to claim 1, wherein the document image includes write information written in the document, wherein the computer readable instructions, when executed by the processor, causing the apparatus to further function as:

a condition determining unit configured to determine whether each of the plural area images satisfies a specific condition based on the write information in a specific area that is included in a corresponding area image, and wherein if the plural area images includes a specific area image satisfying the specific condition, the file generating unit is configured to generate the file such that the specific area image is not displayed.

5. A non-transitory computer-readable medium having a computer program stored thereon and readable by a computer, the computer program, when executed by the computer, causing the computer to functions as:

a document image acquiring unit configured to acquire document image data which is generated by optically reading a document and represents a document image;

an area image generating unit configured to use the document image data so as to generate plural area image data representing plural area images that are included in the document image;

a keyword information acquiring unit configured to acquire plural keyword information corresponding to the plural area images by analyzing at least one of the document image data and the plural area image data; and a file generating unit configured to use the plural keyword information to generate plural files comprising a first file including two or more area image data of a first type among the plural area image data and a second file including one or more area image data of a second type among the plural area image data, wherein each of two or more first-type area images represented by the two or more area image data of the first type includes a first keyword as the keyword information, and wherein each of one or more second-type area images represented by the one or more area image data of the second type includes a second keyword as the keyword information.

6. The non-transitory computer-readable medium according to claim 5, wherein the computer program, when executed by the computer, causing the computer to further function as:

a page number acquiring unit configured to acquire plural page number information corresponding to the plural area image data by analyzing at least one of the document image data and the plural area image data, and wherein the file generating unit is configured to use the plural page number information to generate the file including the plural area images disposed in an order of page numbers.

7. The non-transitory computer-readable medium according to claim 5, wherein the document image includes a first area image and a second area image oriented in different directions, and wherein the file generating unit is configured to generate the file such that the first area image and the second area image are displayed in a same direction.

8. The non-transitory computer-readable medium according to claim 5, wherein the document image includes write information written in the document, wherein the computer readable instructions, when executed by the processor, causing the apparatus to further function as:

a condition determining unit configured to determine whether each of the plural area images satisfies a specific condition based on the write information in a specific area that is included in a corresponding area image, and wherein if the plural area images includes a specific area image satisfying the specific condition, the file generating unit is configured to generate the file such that the specific area image is not displayed.

* * * * *